US 6,638,653 B2

(12) United States Patent
Andou et al.

(10) Patent No.: US 6,638,653 B2
(45) Date of Patent: Oct. 28, 2003

(54) FUEL CELL SYSTEM

(75) Inventors: Akiji Andou, Saitama (JP); Nobutaka Nakajima, Saitama (JP); Yasunori Kotani, Saitama (JP); Masaaki Sakano, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 215 days.

(21) Appl. No.: 09/976,364

(22) Filed: Oct. 15, 2001

(65) Prior Publication Data

US 2002/0045080 A1 Apr. 18, 2002

(30) Foreign Application Priority Data

Oct. 16, 2000 (JP) ........................................ 2000-314847

(51) Int. Cl.⁷ ............................ H01M 8/04; H01M 8/06
(52) U.S. Cl. ............................. 429/20; 429/23; 429/22; 429/13; 429/19
(58) Field of Search ............................. 429/20, 23, 22, 429/13, 19

(56) References Cited

U.S. PATENT DOCUMENTS 6,306,532 B1 * 10/2001 Kurita et al. ................. 429/20

2001/0014414 A1 * 8/2001 Okamoto et al. ............. 429/20
2002/0045077 A1 * 4/2002 Kotani et al. ................. 429/19

* cited by examiner

Primary Examiner—Patrick Ryan
Assistant Examiner—Angela J. Martin
(74) Attorney, Agent, or Firm—Arent Fox Kintner Plotkin & Kahn, PLLC

(57) ABSTRACT

To provide the fuel cell system, which can prevents the imperfect combustion of the fuel gas in combustor caused by shortage of the air exhausted from the fuel cell so that the harmful components is not contained in the exhausted gas, and can prevents the decreasing of the cell voltage by enabling drainage of the produced water from fuel cell certainly.

A flow rate controller 8 is provided in the position between the air compressor 4 and the fuel cell 1 of the air supply line 6. The control unit CU is connected to the air supply line 6, and set the openings of the flow rate controller 8 as temporally wide, and a flow rate of the air supplied to the fuel cell is increased for a predetermined period of time. Then, set the opening of the flow rate controller 8 as gradually narrow, and the flow rate of the air supplied to the fuel cell is decreased gradually.

4 Claims, 9 Drawing Sheets

FIG.9
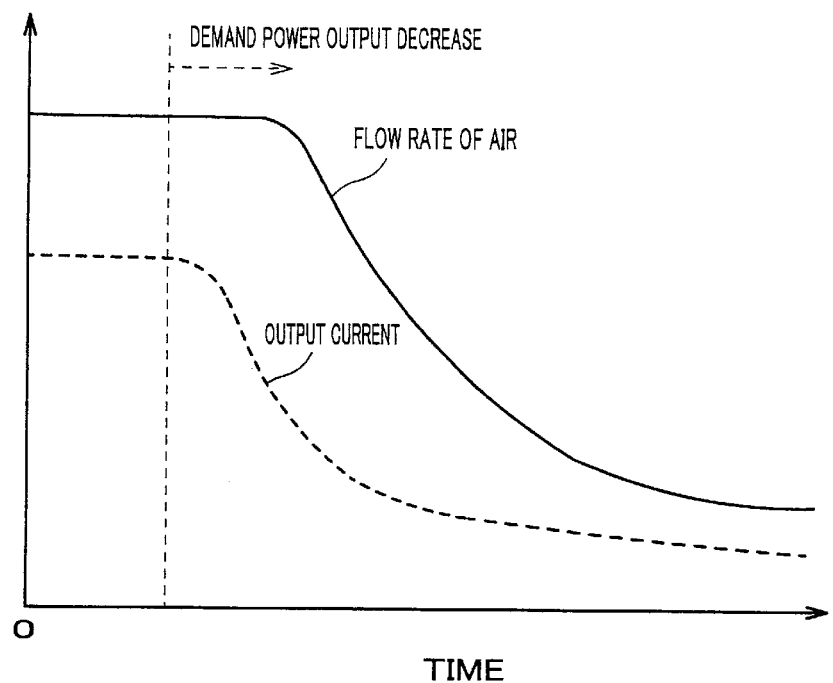
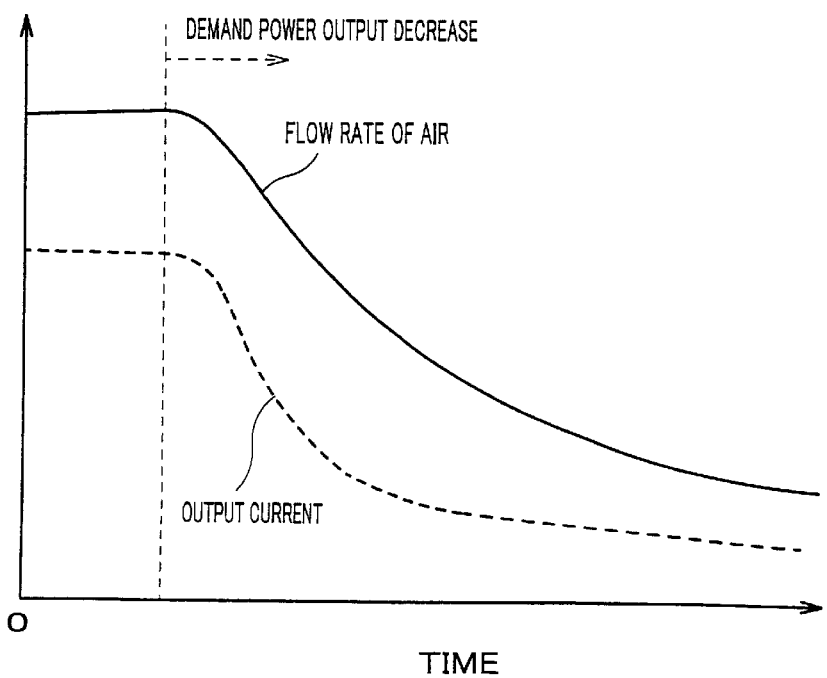

FUEL CELL SYSTEM

BACKGROUND OF THE INVENTION

1. Field of the Invention

The present invention relates to a reforming type fuel cell system, which generates hydrogen enriched fuel gas by reforming the hydrocarbon base fuel such as methanol. The present invention especially relates to a fuel cell system which can be suitably used as a power source of an electric powered vehicle.

2. Prior Art

In recent years, an electric powered vehicles each carrying various driving motors instead of the conventional engine has been developed. As an example of such types of electric powered vehicles, a fuel cell system, as a power source for driving motor, carried vehicle have been sharply developed. A reforming type fuel cell system have been known as one of such a fuel cell system.

With an electric powered vehicle carrying the reforming type fuel cell, when a driver releases an accelerator pedal and an accelerator opening is set at 0, a demand power output to the fuel cell is decreased. In this case, a target value of the output current is made to sharply lessen based on the decreasing of the demand power output to the fuel cell. However when the output current of the fuel cell is sharply decreased to the target value of the output current, the wrong situations such as generation of the surplus hydrogen will be happen.

In order to avoid the occurrence of such a wrong situation, when the target value of the output current is sharply decreased, the output current from the fuel cell is controlled so as to decreased to the target value of the output current with some delay. As shown in FIG. 10, in the conventional fuel cell system, furthermore, the supply of the oxidant gas, such as air, to the fuel cell was decreased based on the decreasing ratio of the output current of the fuel cell.

When the quantity of the air supplied to the fuel cell is decreased at the same decreasing ratio of the output current, however, the quantity of the air which is exhausted from the fuel cell and supplied to the combustor within the evaporator will also be decreased. On the other hand, since the reforming reaction in the reformer progress slowly, the quantity of the hydrogen exhausted from the reformer is not decreased sharply but with a delay time. In just after sharply decreasing of the target value of the output current, the quantity of the air supplied to the combustor is temporary decreased without decreasing of the quantity of the hydrogen supplied to the combustor. In such a case, the incomplete combustion of the fuel gas in the combustor may be caused by the shortage of air. So, when the incomplete combustion occurs, the harmful components, such as carbon monoxide, may be contained in the exhaust gas exhausted from the combustor.

Moreover, when exhausting the air supplied to the fuel cell out of the fuel cell, the produced water, which is produced in the power generation of the fuel cell and remaining in the fuel cell, is also drained. This drainage of the produced water is performed using the pressure caused by the air supplied to the fuel cell. As observed in the conventional fuel cell, however, when the flow rate of the air supplied to the fuel cell is decreased, the pressure in the fuel cell thus will be dropped and then the drainage of the produced water, which remains in the fuel cell, is disturbed. Consequently, since the remained water blocks the air supply line in the fuel cell, the cell voltage will be decreased.

SUMMARY OF THE INVENTION

An object of the present invention, is to provide the fuel cell system, which can prevents the imperfect combustion of the fuel gas in the combustor caused by shortage of the air exhausted from the fuel cell, even if the demand power output to the fuel cell is decreased. Also, there is an object to provide the fuel cell system which can prevents the decreasing of the cell voltage by enabling drainage of the produced water in the fuel cell certainly.

According to the present invention, which attains theses and other objects, there is provided a fuel cell system comprising: a fuel cell to which a fuel gas and an oxidant gas are supplied to generate electricity; a combustor to which an exhaust gas exhausted from the fuel cell is supplied to generates a heat by combustion of the exhaust gas; a reactor which forms the fuel gas by the reforming reaction of an evaporated raw fuel which is evaporated by the heat generated in the combustor; and a flow rate controller which controls the flow rate of the oxidant gas supplied to the fuel cell, said controller decreasing the flow rate of the oxidant gas supplied to the fuel cell with delay to the output current of the fuel cell, when the output of the fuel cell decrease.

With this invention, the flow rate controller, which controls the quantity of the oxidant gas, such as air, supplied to the fuel cell, is provided. The flow rate of the oxidant gas is decreased with delay to the output current of the fuel cell by the flow rate controller, when the output, for example output current, of the fuel cell decreases. The sharply drop of the pressure in the fuel cell is thus prevented even if the output current of the fuel cell is decreased. The imperfect combustion of the fuel gas caused by the shortage of the oxidant gas in the combustor is thus prevented. Furthermore, since the flow rate of the exhaust gas exhausted from the fuel cell is not decreased, the pressure in the fuel cell is maintained. The drainage of the produced water, which is produced as a result of power generation and is remaining in the fuel cell, is thus certainly achieved by the pressure in the fuel cell. Then, the decreasing of the cell voltage of the fuel cell caused by the remaining water will be prevented.

In the fuel cell system, wherein the flow rate controller preferably keeps the flow rate of the oxidant gas at constant or preferably increases the flow rate of the oxidant gas before decreasing the oxidant gas corresponding to the decreasing of the output power of the fuel cell.

With this invention, when the flow rate of the oxidant gas supplied to the fuel cell is decreased with delay on corresponding to reducing quantity of the output current of the fuel cell, the flow rate of the oxidant gas is decreased after making the flow rate of oxidant gas maintain or increase temporally. Therefore, since more oxidant gas will be supplied to the fuel cell even if the output current of the fuel cell will be decreased, more exhaust gases can be supplied to the combustor through the fuel cell. Then, the imperfect combustion of the fuel gas in the combustor is prevented certainly.

Furthermore, since the quantity of the exhaust gas exhausted from the fuel cell will be safe, the produced water generated by the power generation and remaining in the fuel cell is certainly drained.

In the fuel cell system, the flow rate controller controls the flow rate of the oxidant gas based on the oxidant gas flow rate signal computed from the target output current of the fuel cell and target value of the fuel gas of the exhaust gas exhausted from the reactor.

With this invention, in the case that the flow rate of the oxidant gas is controlled using the flow rate controller, the oxidant gas flow rate signal computed by the target value of output current and the target output value of exhausted fuel is used. The flow rate of the oxidant gas is thus determined without using the another equipment.

BRIEF DESCRIPTION OF THE DRAWINGS

FIG. 9 is a graph showing the timewise change of the low rate of the air supplied to the fuel cell and the output current of the fuel cell.

DESCRIPTION OF THE PREFERRED EMBODIMENTS

Figure 1:
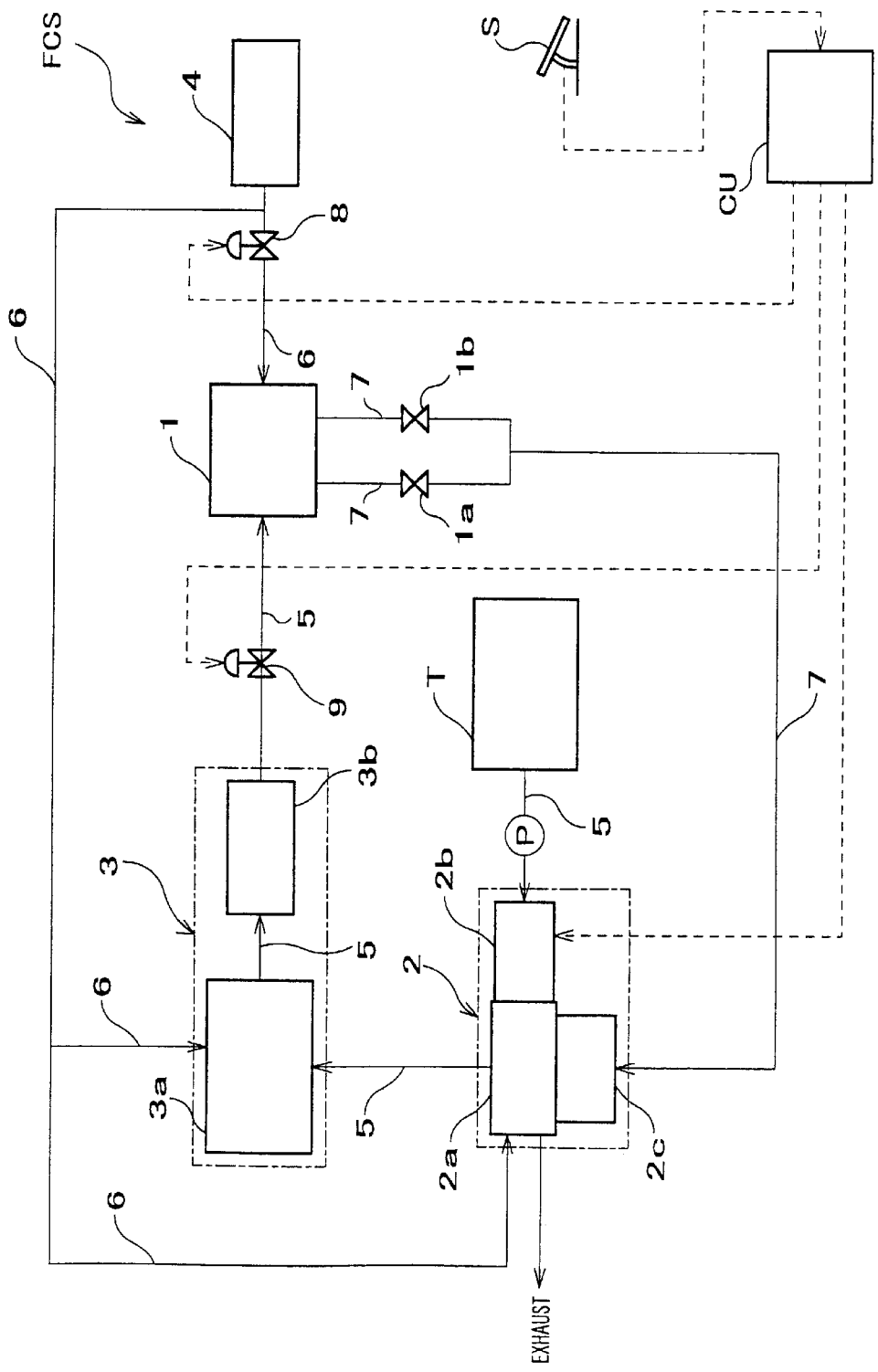
FIG. 1 is a block diagram of the fuel cell system according to the present invention.

The preferred embodiment of the present invention will now be described by referring to the attached drawings. FIG. 1 is a block diagram of the fuel cell system according to the present invention. As shown in FIG. 1, the fuel cell system FCS according to the present invention is carried in the fuel cell type electric powered vehicle. The fuel cell system FCS consist essentially of a fuel cell 1, a evaporator unit 2, a reactor unit 3 as a reformer of this invention, and an air compressor 4.

The fuel cell 1 has a stack structure obtained by laying a plurality of cells, which are power generation units, one upon another, and divided into an anode-side and a cathode-side by these cells. With this fuel cell 1, the fuel gas is supplied to the anode-side and the air containing oxygen as an oxidant gas is supplied to the cathode side.

The evaporator unit 2 is composed of an evaporator 2a, a raw fuel injection device 2b, and a catalytic combustor 2c, which is the combustor of this invention. The raw fuel injection device 2b is provided in the upper direction of the evaporator 2a and controls the quantity of the raw fuel supplied to the evaporator 2a. A tank T, which stores the raw fuel liquid such as water/methanol mixed-liquid, is connected to the raw fuel injection device 2b and from which the raw fuel liquid is supplied to the raw fuel injection device 2b through a pump P. The catalytic combustor 2c is provided in the lower part of the evaporator 2a, and to which an off-gas (explains later) exhausted from the fuel cell 1 is supplied. The off-gas exhausted from the fuel cell 1 is burned in the catalytic combustor 2c and produces heat. The heat produced by combustion of the off-gas is applied to the evaporation of the raw fuel liquid supplied to the evaporator 2a.

The reactor unit 3 is composed of a reformer 3a and a carbon monoxide remover 3b. The reformer 3a makes the raw fuel gas obtained by vaporization of the raw fuel liquid in the evaporator unit 2 into the fuel gas containing much hydrogen by the reforming reaction. The fuel gas obtained by the reforming reaction in the reformer 3a is supplied to the carbon monoxide remover 3b, and then, the harmful components such as carbon monoxide (CO) contained in the fuel gas is eliminated. The fuel gas, from which the harmful components are eliminated, is thus exhausted from the reactor unit 3 and then supplied to the anode side of the fuel cell 1.

A fuel gas supply line 5 connects the tank T, the evaporator unit 2, the reactor unit 3, and the fuel cell 1. The raw fuel liquid supplied form the tank T, the raw fuel gas exhausted from evaporator unit 2, and the fuel gas exhausted from the reformer 3a and the reactor unit 3, passes the fuel gas supply line 5 respectively.

The air compressor 4 absorbs the air which is oxidant gas, i.e., the fresh air, and then supplies the absorbed air to the fuel cell 1, and also supplies the absorbed air to the reformer 3a in the reactor unit 3 and the evaporator 2a in the evaporator unit 2. An air supply line 6 connects the air compressor 4, the reformer 3a, and the evaporator 2a. Then, the air supplied form the air compressor 4 passes the air supply line 6 and supplied to each devices which is connected by this air supply line 6.

The off-gas which is an exhaust gas is exhausted from the both sides (an anode-side, a cathode-side) of the fuel cell 1. The fuel gas, which was not used in the reaction, is exhausted from anode-side of the fuel cell 1 as an anode-side off-gas. The air, which was not used in the reaction, is exhausted from cathode-side of the fuel cell 1 as a cathode-side off-gas. An anode-side pressure control valve 1a is provided at the anode-side outlet of the fuel cell 1 and controls the pressure in the anode-side of the fuel cell 1 by controlling the flow rate of the anode-side off-gas. A cathode-side pressure control valve 1b is provided at the cathode-side outlet of the fuel cell 1 and controls the pressure in the cathode-side of the fuel cell 1 by controlling the flow rate of the cathode-side off-gas.

The anode-side off-gas and the cathode-side off-gas are supplied to the catalytic combustor 2c of the evaporator unit 2. The anode-side off-gas supplied to the catalytic combustor 2c burns on considering the anode-side off-gas as a fuel and the cathode-side off-gas as an oxidizing agent, and then generates the heat used for the evaporation of the liquid fuel in the evaporator 2a. An off-gas line 7 is connected to the fuel cell 1, the anode-side pressure control valve 1a, the cathode-side pressure control valve 1b, and the catalytic combustor 2c of evaporator unit 2. The anode-side off-gas and the cathode-side off-gas are supplied to the catalytic combustor 2c through the off-gas line 7.

A flow rate control valve 8, as a flow rate controller of this invention, is provided in the position between the air compressor 4 and the fuel cell 1 of the air supply line 6. The flow rate control valve 8, such as gate valve and the like, controls the flow rate of the air supplied to the fuel cell 1. A flow control valves (not drawn) are provided on the air supply line 6 of the front position of the evaporator 2a and the front position of the carbon monoxide remover 3b. Each of the flow control valves (not shown) controls the flow rate of the air supplied to the evaporator unit 2a and the carbon monoxide remover 3b.

A fuel gas flow control valve 9, which controls the flow rate of the fuel gas supplied to the fuel cell 1, is provided in the downstream-side direction of the reactor unit 3 of the fuel gas supply line 5. The fuel gas flow control valve 9, such as a gate valve and the like, controls the flow rate of the fuel gas supplied to the fuel cell 1. Then, the power generation of the fuel cell 1 is controlled by controlling the flow rate of the fuel gas supplied to the fuel cell using the flow control valve. That is, when the opening of the fuel gas flow control vale 9 is set as wide and a large amount of the fuel gas is supplied to the fuel cell 1, the power generation of the fuel cell 1 will be increased. On the contrary, when the opening of the fuel gas flow control vale 9 is set as narrow and a small amount of the fuel gas is supplied to the fuel cell 1, the power generation of a fuel cell 1 will be decreased.

The fuel cell system FCS has a control unit CU, which is electrically connected to an accelerator sensor S, the raw fuel injection device 2b of the evaporator unit 2, the flow rate control valve 8, and the fuel gas flow control unit 9. The accelerator sensor S detects the opening of the accelerator pedal of the electric powered vehicle carrying the fuel cell. Thus, the control unit CU exchanges an electrical signal between each devices and the control unit CU.

The function of the fuel cell 1 having the above-described composition will be explained.

With the control unit CU, the demand power output to the fuel cell 1 is computed based on a storage power of the battery (not shown) and the accelerator-opening signal which is obtained from the accelerator sensor S and indicates the opening of the accelerator pedal. Depending on the computed required output to the fuel cell 1, the target value of the output current of the fuel cell 1 is obtained. Depending on the target value of the output current of the fuel cell 1, the output current of the fuel cell is thus determined. After determining the output current, the opening of the fuel gas flow control valve 9 is controlled corresponding to the output current by the control unit CU.

With this invention, when a driver release the accelerator pedal and the accelerator opening signal from the accelerator sensor is set at 0, the demand power output of the fuel cell is decreased. At this time, The control unit CU decreases the flow rate of the air supplied to the fuel cell 1 with delay to the decreasing of the output current of the fuel cell 1 by decreasing the flow rate of the air after making the flow rate once increase. Therefore, when the output current of the fuel cell 1 decreases, the control unit CU sets the opening of the flow rate control valve 8 to wide so that the flow rate of the air supplied to the fuel cell 1 may once increase.

Since sufficient air is supplied to the cathode-side of the fuel cell 1 by increasing the flow rate of the air supplied to the fuel cell 1, sufficient air as the cathode-side off-gas is also supplied to the catalytic combustor 2c of the evaporator unit 2. Thus, when the anode-side off-gas is burned in the catalytic combustor 2c, the cathode-side off-gas which works as oxidization gas is fully supplied to the catalytic combustor 2c.

The timewise change in the flow rate of the air supplied to the fuel cell 1 and the output current of the fuel cell 1 will be explained with reference to the graph shown in FIG. 2. When the demand power output to the fuel cell 1 is kept in constant, such as in traveling the electric powered vehicle carrying the fuel cell at a constant rate, the flow rate of the air supplied to the fuel cell 1 and the output current of the fuel cell 1 are kept in constant. Next, when the electric powered vehicle carrying the fuel cell slows down by the driver's releasing operation of the accelerator pedal, the target value of the output current will largely decreased. At this time, to decrease the generation of the surplus hydrogen, the output current is gradually decreased with delay to the decreasing of the target value of the output current.

On the other hand, the flow rate of the air supplied to the fuel cell 1 is temporary increased with the decreasing of the target value of the output current. After making the quantity of the air supplied to a fuel cell 1 increase during a predetermined period of time, for example 2 seconds, the quantity of the air supplied to the fuel cell 1 is decreased. Thus, when the demand power output to the fuel cell 1 is decreased, the flow rate of the air supplied to the fuel cell 1 is gradually decreased with delay to the decrease of the output current of the fuel cell 1. Since the drop of the pressure in the fuel cell 1 is prevented by such controls of the supply of the air even if the output current of the fuel cell 1 is decreased, the quantity of the exhaust gas as oxidant gas supplied to the combustor through the fuel cell 1 is not decreased temporarily. The incomplete combustion of the fuel gas caused by the shortage of the oxidant gas in a combustor is thus prevented. Furthermore, the decreasing of the cell voltage is prevented by certain drainage of the produced water remained in the fuel cell 1.

Figure 3:
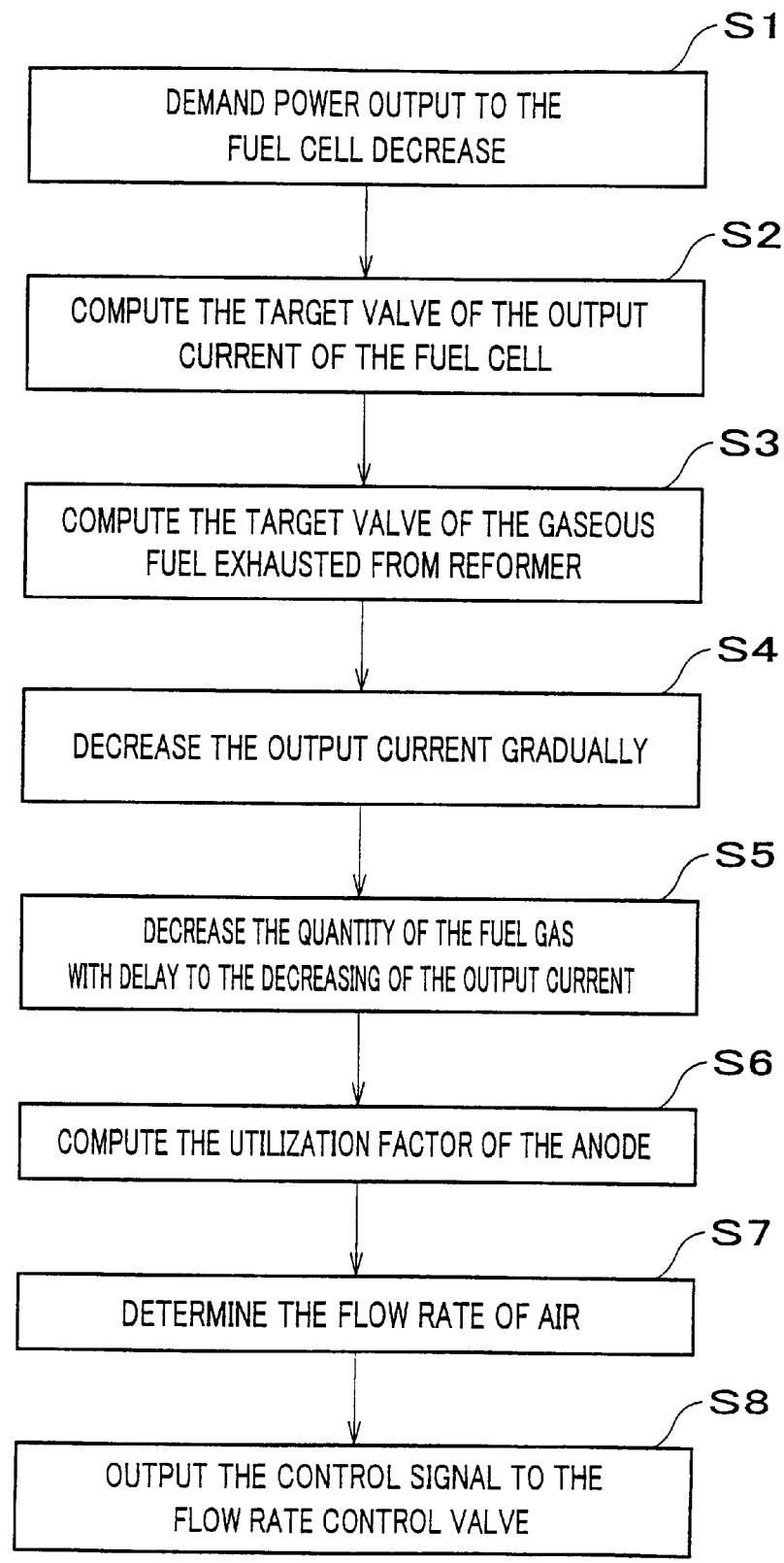
FIG. 3 is a flow chart of showing the procedure of determining the flow rate of the air supplied to the fuel cell 1.

Next, one example of the procedure that determines the flow rate of the air supplied to the fuel cell 1, by controlling the opening of the flow rate control valve 8 will be explained. FIG. 3 is a flow chart of showing the procedure of determining the flow rate of the air supplied to the fuel cell 1. For determine the flow rate of the air supplied to the fuel cell 1, the target value of the output current and the target value of exhausted fuel gas are used.

First, the demand output to the fuel cell 1 is determined based on the accelerator opening signal from the accelerator sensor S, the residual quantity signal of the battery, etc. When a driver releases the accelerator pedal, for example, the accelerator opening signal is decreased and then the demand power output to the fuel cell 1 is also decreased (S1). Then, the demand power output to the fuel cell 1 decreases, the target value of the output current of the fuel cell 1 is computed based on the decreased quantity of the demand power output (S2). Simultaneously, the target value of the fuel gas exhausted from the reformer 3a is computed based on the decreased quantity of the demand power output (S3). Then, the output current of the fuel cell 1 is decreased gradually with respect to the target value of the output current (S4) using the target value of output current computed in the step 3 (S3).

In the step 4 (S4), for prevent the surplus supply of the fuel gas to the anode side of the fuel cell 1, the output current is gradually decreased with delay. The decreasing rate of the output current at this time is suitably determined according to the deviation between target value of the output current and the current output, and according to the quantity of generation of the fuel gas, and the like.

When the output current of the fuel cell 1 begin to decrease, the quantity of the fuel gas exhausted from the reformer 3a is decreased with delay to the decreasing of the output current of the fuel cell 1 (S5). The timing that start the decreasing of the quantity of fuel gas exhausted from the reactor unit 3 can be set about 2-second later from the time that decreasing of the output current from the fuel cell 1 began. The reason for delaying the timing, that begins to decrease the quantity of the fuel gas exhausted from reformer 3a, is for controlling the flow rate of the air supplied to a fuel cell 1. This reason is explained later.

Figure 4:
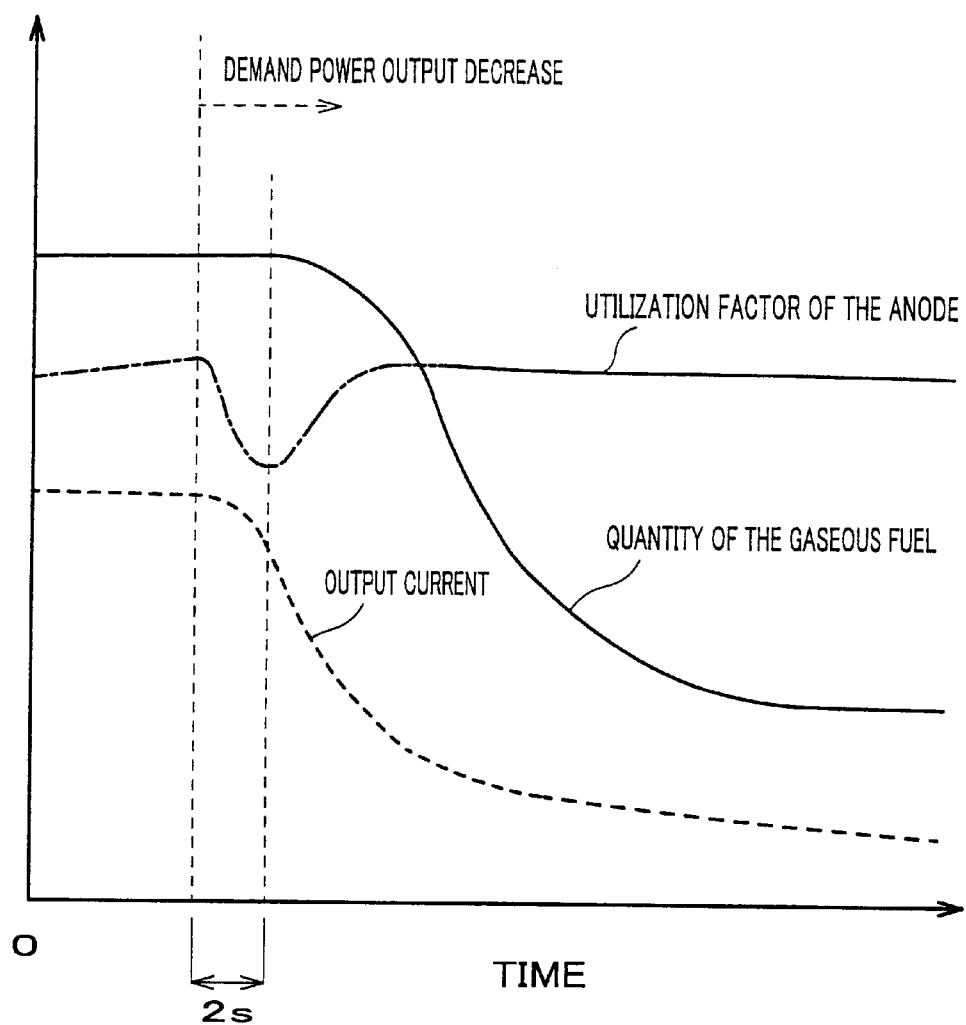
FIG. 4 is a graph showing the relation between the output current and amount of the fuel gas.

The relation between the output current and the quantity of exhausted fuel gas at step 5 (S5) is shown in FIG. 4. First, change of the output current is explained. As shown in FIG. 4, when the demand power output to the fuel cell 1 decrease, the output current from the fuel cell 1 begins to be decreased, and then decreased toward the target value of the output current with delay continuously. Next, change of the quantity of the fuel gas exhausted form the reformer 3a is explained. As shown in FIG. 4, the quantity of the fuel gas exhausted from the reformer 3a begins to be decreased with delay to the output current, after passing for about 2 seconds from the time that the output current of the fuel cell 1 began to decrease. Then, the gradual decreasing of the quantity of the fuel gas is continued until it reaches to the target value thereof with delay to the decreasing of the output current.

When the quantity of the fuel gas exhausted from the reformer 3a and the output current of the fuel cell 1 begin to decrease, compute the utilization factor of the anode of the fuel cell 1 (S6).

The utilization factor of the anode is computable with following formula (A):

$$\text{The utilization factor of the anode} = \text{the output current}/\text{the quantity of the fuel gas} \quad (A)$$

The flow rate of the air supplied to the fuel cell 1 is determined using the quantity of the fuel gas exhausted from the reformer 3a and the utilization factor of the anode (S7), after computing the utilization factor of the anode with formula (A).

The timewise change in the utilization factor of an anode in the case, that the quantity of the output current from the fuel cell 1 and the quantity of the fuel gas exhausted from reformer 3a is changed with decreasing of the demand power output, is also shown in drawing 4. Before the demand power output is decreased, the utilization factor of the anode is maintained. When the output current decreases with the decreasing of the demand power output, the utilization factor of the anode also decreases. When the quantity of the fuel gas exhausted from the reformer 3a begins to be decreased with time passing, the utilization factor of the anode begins to be increased. When the decreasing rate of the output current and the quantity of the exhausted fuel gas becomes nearly the same, the utilization factor of the anode becomes nearly constant.

Figure 5:
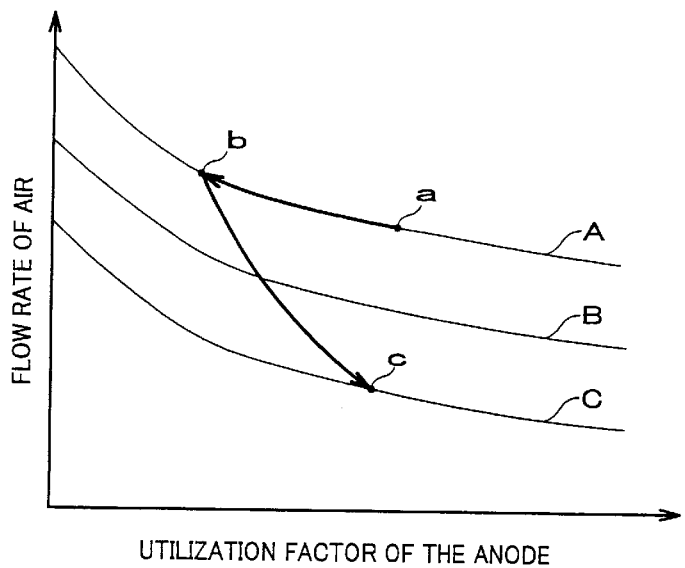
FIG. 5 is a graph showing the relation of the utilization factor of the anode, amount of the fuel gas, and the flow rate of the air supplied to the fuel cell.

The utilization factor of the anode, the quantity of the fuel gas exhausted from the reformer 3a, and the flow rate of the air supplied to the fuel cell 1 have relation as shown in FIG. 5. The utilization factor of the anode is obtained by the relationship between the output current and the quantity of the fuel gas. With FIG. 5, the flow rate of the air to the fuel cell 1 is assigned to the vertical axis, and the utilization factor of the anode is assigned to the horizontal axis. The relation of the flow rate of air and the utilization factor of the anode change considering the quantity of the fuel gas exhausted from reformer 3a as a parameter. That is, when the quantity of the fuel gas is large, the flow rates of the air supplied to the fuel cell 1 becomes large, so the relation between the flow rate of the air and the utilization factor of the anode is explained as Graph A. The flow rate of the air supplied to the fuel cell 1 is continuously decreased corresponding to the decreasing of the quantity of fuel gas. The relation between the flow rate of the air and the utilization factor of the anode changes from Graph B to Graph C.

The flow rate of the air in the case where the utilization factor of the anode and the quantity of the fuel gas change along with the figure as shown in FIG. 4 will be explained. When the demand power output to the fuel cell 1 is kept at constant, the quantity of the fuel gas is kept at constant. In this case, the utilization factor of the anode and the flow rate of the air have the relation as shown in Graph A. Moreover, since the utilization factor of the anode at this time is maintained, the flow rate of the air supplied to the fuel cell 1 is regarded as the quantity corresponding to the location of the point "a" in FIG. 5. Since the quantity of the fuel gas is kept at constant for a while after the demand power output to the fuel cell 1 is decreased, the relation between the utilization factor of anode and the flow rate of air has the relation shown in Graph A. And Since the utilization factor of the anode decreases with the decreasing of the demand power output, the flow rate of air supplied to the fuel cell 1 increases along with Graph A.

When the flow rate of the air supplied to the fuel cell 1 and the utilization factor of the anode reaches at the point "b" as passing for a while, for example about 2 seconds, the quantity of the fuel gas exhausted form the fuel cell 1 begins to be decreased. With this decreasing of the quantity of the fuel gas, the parameter in FIG. 5 is changed and thus the relation between the utilization factor of the anode and the flow rate of the air supplied to the fuel cell 1 shifts to Graph B and Graph C.

Under the present circumstances, the utilization factor of the anode is decreased simultaneously with the start of the decreasing of the fuel gas. The utilization factor of the anode and the flow rate of the air supplied to the fuel cell 1 thus shifts to point "c" from point "b". When they reach to point "c", the flow rate of the fuel gas, and the utilization factor of the anode become constant. Then, the flow rate of the air supplied to the fuel cell 1 also becomes constant.

The control signal is outputted to the flow rate control valve 8 from control unit CU so that the air is supplied to the fuel cell 1 with a determined flow rate (S8).

Figure 6:
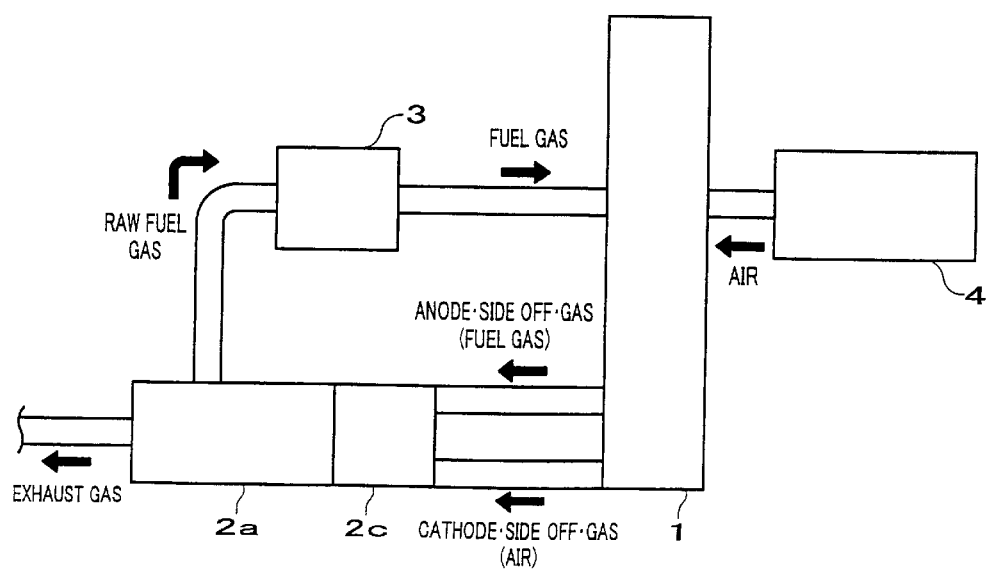
FIG. 6 is a block diagram of the experiment equipment used in the experiment about the advantage of the present invention.

The advantages of the present invention will be explained based on the result of the experiment as follows. In order to prove the advantages of this invention, experiment using the experiment equipment shown in FIG. 6 is done. As shown in FIG. 6, this experiment equipment has a fuel cell 1. An evaporator 2a, a catalytic combustor 2c for supplying the heat to the evaporator 2a, and a reactor 2 are arranged at the anode side of the fuel cell 1. An air compressor 4 for supplying the air as an oxidizing agent to the fuel cell 1 is arranged at the cathode side of the fuel cell 1.

With this experiment equipment, the functions describe below are same as that of the above-described fuel cell system according to the present invention. That is, the raw fuel gas is exhausted from the evaporator 2a and then supplied to the reactor unit 3. The raw fuel gas supplied to the reactor unit 3 is reformed to the fuel gas and then supplied to the fuel cell 1. Anode side off-gas (fuel gas) is exhausted from the anode side of the fuel cell 1 and supplied to the catalytic combustor 2c. Cathode side off-gas (an air) is exhausted from the cathode side of the fuel cell 1 and supplied to the catalytic combustor 2c.

Figure 2:
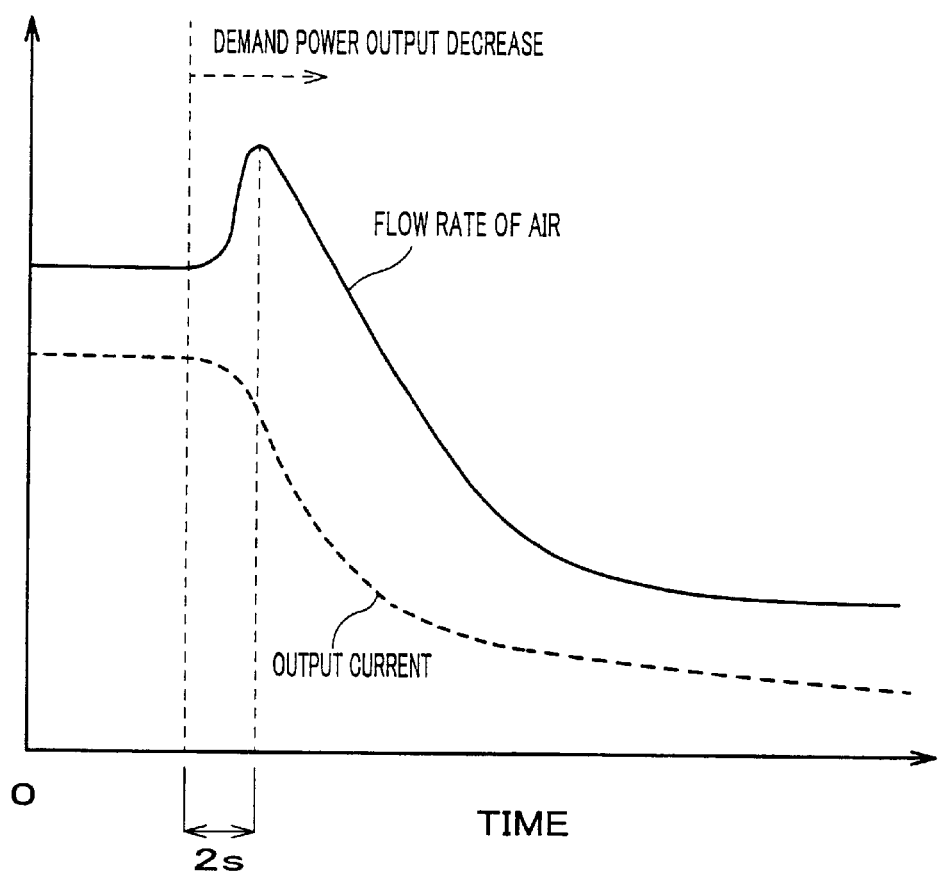
FIG. 2 is a graph showing the timewise change in the flow rate of the air supplied to the fuel cell 1 and the output current of the fuel cell 1.
Figure 10:
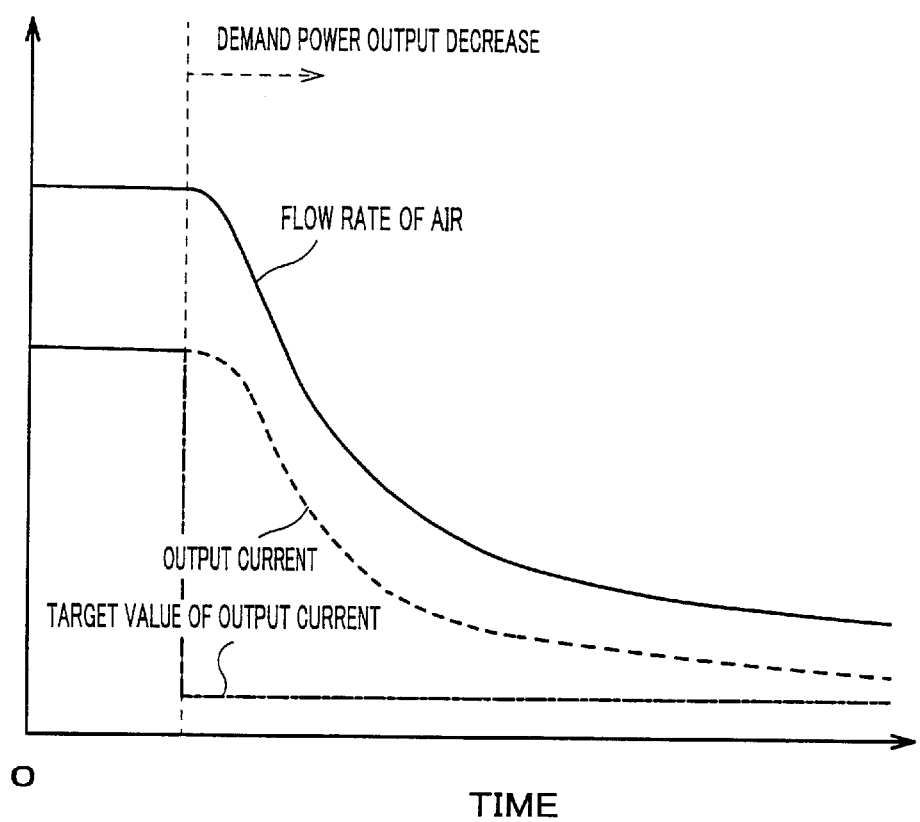
FIG. 10 is a graph showing the timewise change of the low rate of the air supplied to the fuel cell, the output current of the fuel cell and output current.

As an example of the fuel cell system according to the present invention, the experiment equipment was controlled so that the output current from the fuel cell 1 and the flow rate of the air supplied to the fuel cell 1 will changes along with the locus shown in FIG. 2, respectively. As an example of the conventional fuel cell system, the experiment equipment was controlled so that the output current outputted from the fuel cell 1 and the air flow rate supplied to the fuel cell 1 will changes along with the locus shown in FIG. 10, respectively. The concentration of carbon monoxide (CO) contained in the exhaust gas exhausted from the evaporator 2a of the fuel cell system and the cell voltage at that time of each experiment were measured. The result of this measurement is shown in FIG. 7 and FIG. 8.

Figure 7:
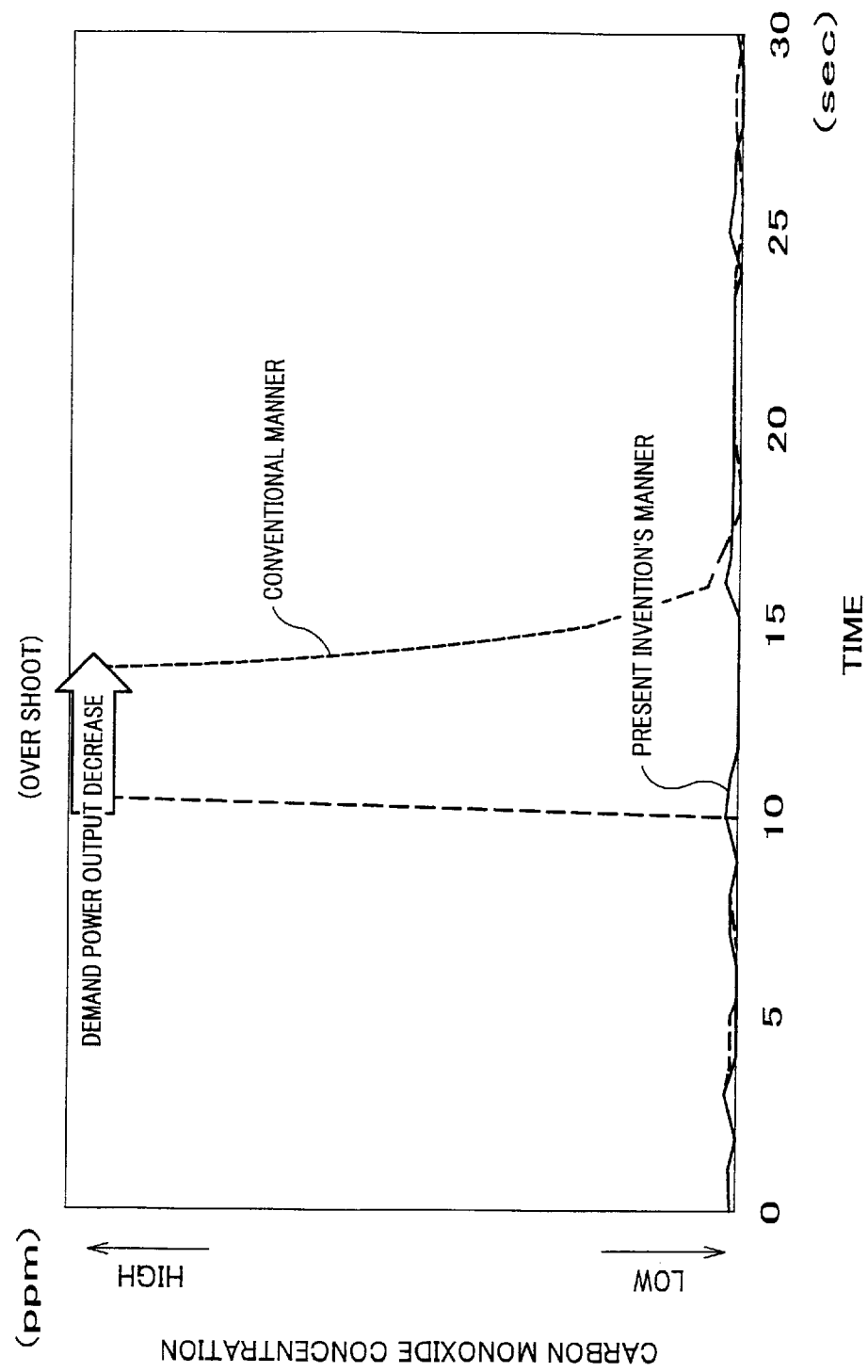
FIG. 7 is a graph showing the timewise changes of the concentration of carbon monoxide (CO) contained in the exhaust gas on the experiment.

The change of the carbon monoxide concentration in the exhaust gas exhausted from the catalytic combustor 2c through the evaporator 2a is shown in FIG. 7. As shown in FIG. 7, when the experiment equipment is controlled according to the manner of the present invention, the carbon monoxide (CO) was not detected in the exhaust gas. When the experiment equipment is controlled according to the conventional manner, however, the concentration of the carbon monoxide (CO) rapidly increased while the decreasing of the demand power output. According to these experiments, the harmful components such as carbon monoxide (CO) contained in the exhaust gas will be removed by controlling the experiment equipment with the manner of the present invention.

Figure 8:
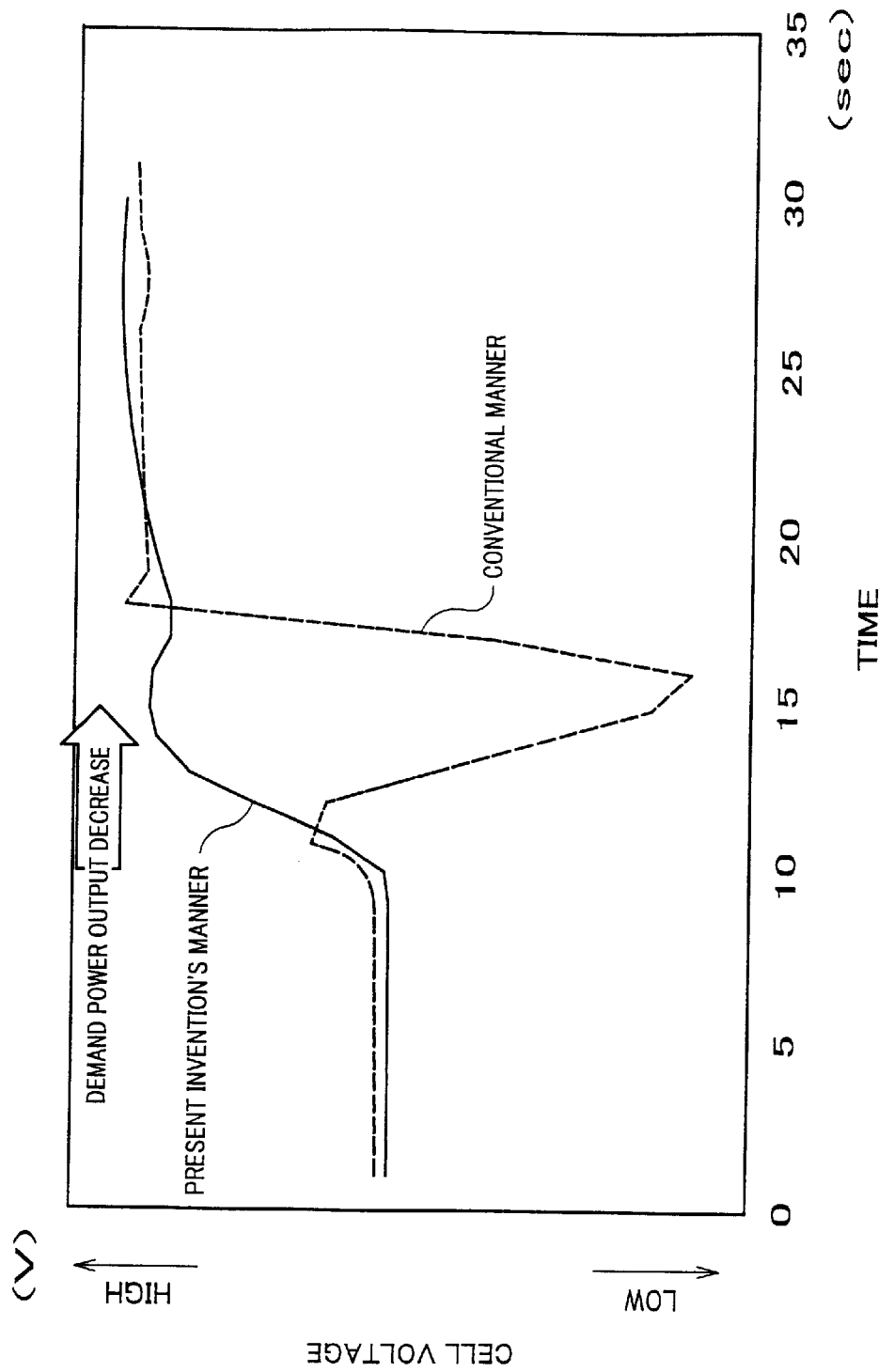
FIG. 8 is a graph showing the timewise change in the cell voltage of the fuel cell on the experiment.

The timewise change in the cell voltage of the experiment equipment is shown in FIG. 8. As shown in FIG. 8, when the demand power output is decreased on controlling the experiment equipment with the manner of the present invention, the cell voltage rose slightly, and then the cell voltage was kept in constant without decreasing. When the demand power output is decreased on controlling the experiment equipment with the conventional manner, however, the cell voltage rose slightly, and then fell greatly. According to these experiments, the cell voltage can be kept constant without decreasing by controlling the experiment equipment with the manner of the present invention even if the demand power output falls greatly.

The preferred embodiment of the present invention is described above, but the present invention is not limited to this embodiment.

With the fuel cell system according to the above-described embodiment, when it is necessary to decrease the flow rate of the oxidizing agent with delay to the output current of the fuel cell due to the decreasing of the demand power output to the fuel cell, the flow rate of the air, which is an oxidant gas, is decreased after making the flow rate once increase.

As an another controlling manner of the fuel cell system as follows manner will be acceptable. That is, as shown in FIG. 9A, when decrease the output current from the fuel cell respond to the decreasing of the demand power output, keep the flow rate of the air supplied to the fuel cell at constant for a predetermined time, such as 2 seconds, and then decreases the flow rate of the air to the target value of the output current.

As described above, a controlling manner, in which the flow rate of the air supplied to the fuel cell is decreased after keeping the flow rate of the air for a while, in the case that decrease the flow rate of the air correspond to the decrease of the required output to the fuel cell 1, will be acceptable.

Another controlling manner of the fuel cell system as follows will be acceptable. In this manner, when decrease the flow rate of air respond to the decreasing of the demand power output to the fuel cell 1, the decreasing rate of the supply of the air is set up smaller than the reduction rate of the output current. This controlling manner is effective especially when the reduction rate of the demand power output to the fuel cell 1 is high.

The fuel cell system according to claim 1, the pressure in the fuel cell does not drop greatly even if when the demand power output to the fuel cell is decreased. So the quantity of the exhaust gas which is supplied to the combustor through the fuel cell is not decreased rapidly. Therefore, the imperfect combustion of the fuel gas caused by the shortage of oxidant gas at the combustor will be prevented. Since the flow rate of the exhaust gas exhausted from the fuel cell is not decreased, the pressure in the fuel cell is not dropped. The produced water, which is caused by the power generation and remains in the fuel cell, is thus drained from the fuel cell certainly. So, the fall of the cell voltage caused by the produced water remaining in the fuel cell can be prevented.

The fuel cell system according to claim 2, since more oxidant gas will be supplied to the fuel cell even if the output current of a fuel cell is decreased, many exhaust gases can be supplied to the combustor. The incomplete combustion of the fuel gas in the combustor thus can be prevented still more certainly.

The fuel cell system according to claim 3, the flow rate of the oxidizing agent is controlled using the oxidant gas flow rate signal computed by the target value of the output current and the target value of exhausted fuel gas. The flow rate of the oxidizing agent thus will be determined without setting up the another equipment.

What is claimed is:
1. A fuel cell system comprising:
   a fuel cell to which a fuel gas and an oxidant gas are supplied to generate electricity;
   a combustor to which an exhaust gas exhausted from the fuel cell is supplied to generate a heat by combustion of the exhaust gas;
   a reactor which forms the fuel gas by the reforming reaction of an evaporated raw fuel which is evaporated by the heat generated in the combustor; and
   a flow rate controller which controls the flow rate of the oxidant gas supplied to the fuel cell,
   said controller decreasing the flow rate of the oxidant gas supplied to the fuel cell with delay to the output current of the fuel cell, when the output of the fuel cell decreases.
2. A fuel cell system according to claim 1, wherein the flow rate controller keeps the flow rate of the oxidant gas at constant or increases the flow rate of the oxidant gas before decreasing the oxidant gas corresponding to the decreasing of the output power of the fuel cell.
3. A fuel cell system according to the claim 1, the flow rate controller controls the flow rate of the oxidant gas based on the oxidant gas flow rate signal computed from the target output current of the fuel cell and target value of the fuel gas of the exhaust gas exhausted from the reactor.
4. A fuel cell system according to the claim 2, the flow rate controller controls the flow rate of the oxidant gas based on the oxidant gas flow rate signal computed from the target output current of the fuel cell and target value of the fuel gas of the exhaust gas exhausted from the reactor.

* * * * *